United States Patent [19]

Pringle

[11] 4,279,131
[45] Jul. 21, 1981

[54] CONSTANT VELOCITY JOINT

[75] Inventor: William L. Pringle, Grosse Pointe Shores, Mich.

[73] Assignee: United States Steel Corporation, Pittsburgh, Pa.

[21] Appl. No.: 68,122

[22] Filed: Aug. 20, 1979

[51] Int. Cl.³ .............................................. F16D 3/30
[52] U.S. Cl. ............................................... 64/21; 64/8
[58] Field of Search ...................... 64/21, 8, 23, 17 R

[56] References Cited

U.S. PATENT DOCUMENTS

| | | | |
|---|---|---|---|
| 3,406,534 | 10/1968 | Chapper | 64/8 |
| 3,609,994 | 10/1971 | Colletti et al. | 64/8 |
| 3,895,501 | 7/1975 | Holmes | 64/8 |
| 3,990,267 | 11/1976 | Orain | 64/8 |
| 4,083,202 | 4/1978 | Westercamp | 64/8 |
| 4,145,896 | 3/1979 | Pringle | 64/21 |

Primary Examiner—Ira S. Lazarus
Assistant Examiner—Magdalen Moy
Attorney, Agent, or Firm—William F. Riesmeyer, III

[57] ABSTRACT

A constant velocity joint having first and second rotatable bodies, at least one of the bodies being angularly and axially displaceable with respect to the other. An elongated member for transmitting torque between the bodies extends in its longitudinal direction transversely in a slot in one of the bodies and is connected to the other body. The member is slidable along and pivotable about its transverse axis in the direction of the slot length so as to provide free axial and angular movement of the bodies during their rotative movement. Apparatus is also provided for keeping the member centered in the slot, and includes a ball mounted on the center of each side of the member which rides in a semicircular longitudinal channel along the center of the slot sidewall and is freely slidable and rotatable therein.

3 Claims, 2 Drawing Figures

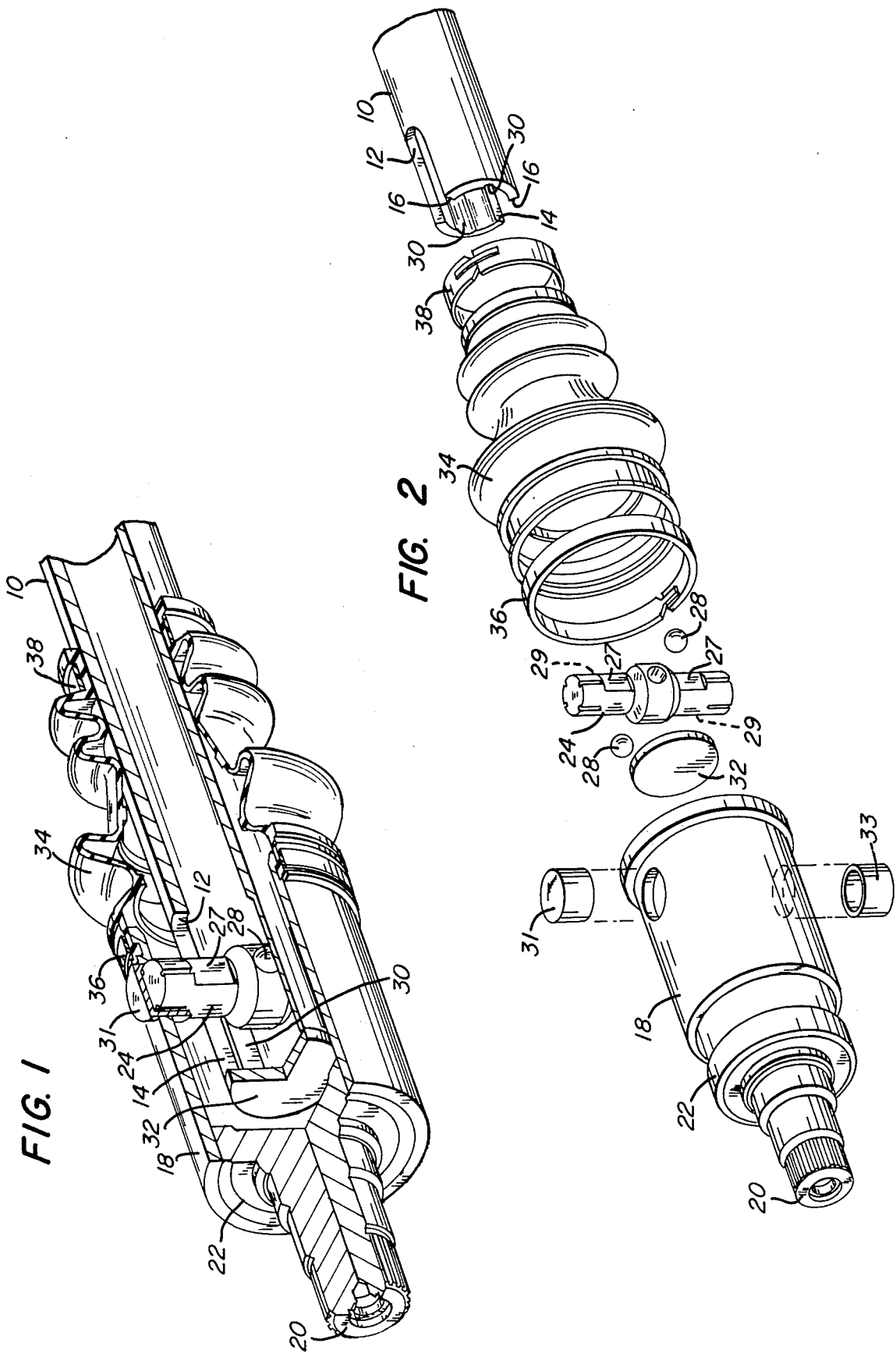

CONSTANT VELOCITY JOINT

BACKGROUND OF THE INVENTION

This invention relates to a constant velocity joint, particularly to a constant velocity joint providing for substantial angular and axial displacement of the rotative bodies, as for example may be used in a front wheel drive vehicle.

In front wheel drive vehicles, the drive shaft extends laterally from the transmission to the wheels, and must provide for angular movement with respect to the transmission as the wheels move up and down in a vertical plane. Since the wheels do not move in a radius about the connection of the drive shaft to the transmission, the length of the shaft must be able to change and thus provision must be made for axial movement. Normally constant velocity joints used in such high torque applications are made of heat treated steel forgings which require substantial amounts of difficult machining to obtain circular or elliptical surfaces and must be made to close tolerances. These joints are very expensive to make and for their size are very heavy and add weight to the vehicle. Efforts have been made to reduce the cost of making universal joints as indicated by the design in U.S. Pat. No. 3,815,381 which shows a cage made of a die formed cylinder of heavy wall construction. However, considerable machining is still required and such joints do not have reduced weight. Joints presently available use a plurality of balls slidable in channels in either an inner and/or outer cage member for transmitting torque. Such a joint is shown in U.S. Pat. No. 1,533,425. These joints are subject to substantial wear at the interface between the balls and channels since torque is transmitted there. The balls also serve, however, as centering devices to maintain alignment between input and output shafts. Thus, as wear proceeds, there can be substantial play between the parts which increases the possibility of further wear and actual separation and failure of the joint. Another disadvantage is that the angle of articulation of such joints is limited due to the plurality of balls and the size of the cage housing them. Means other than the ball in channel type have been tried for transmitting torque, e.g., as shown in U.S. Pat. No. 3,406,534 and U.S. Pat. No. 3,903,711. In U.S. Pat. No. 3,406,534 Chapper, the joint provides for angular and axial movement of the shafts but the axial movement is crude in that one of the shafts itself is simply slidable in the coupling. This is obviously satisfactory for a toy but not for use in a larger vehicle. The joint of U.S. Pat. No. 3,903,711 provides solely for angular movement and not axial movement.

Thus, it is an object of this invention to provide a constant velocity joint which provides for both axial and angular displacement with a minimum amount of wear, is easy and inexpensive to fabricate and of light weight.

It is also an object of this invention to provide a constant velocity joint which provides for substantial angular and axial displacement and has separate means for transmitting torque and maintaining alignment of the apparatus.

SUMMARY OF THE INVENTION

According to this invention, a constant velocity joint is provided having first and second rotatable bodies, at least one of the bodies being angularly and axially displaceable with respect to the other. An elongated slot is provided adjacent one end of the first body, with the longitudinal slot axis being coincident with the axis of rotation of the first body. An elongated torque transmitting member is mounted in the slot and extends longitudinally in the transverse slot direction. The longitudinal sides of the member engage the opposite slot sidewalls for transmitting rotary motion and torque between the bodies. The member is connected to the second body at right angles to the axis of rotation of the second body. The member is also slidable and pivotable in the direction of the slot length. Since the member contacts the first body only at two locations diametrically opposite from the axis of rotation of said first body, the joint provides for substantially unrestricted angular articulation of the two bodies. Separate means is provided for maintaining the centerpoint of the member coincident with the longitudinal axis of the slot during its relative movement therein, and also provides a transverse pivot axis for the elongated member.

BRIEF DESCRIPTION OF THE DRAWINGS

FIG. 1 is an isometric partially cut-away view of the apparatus of this invention, FIG. 2 is an exploded view of the apparatus in FIG. 1.

DESCRIPTION OF THE PREFERRED EMBODIMENT

The constant velocity universal joint of this invention is especially applicable for use as an inboard joint in a front wheel drive automobile, i.e., a joint at the transmission end of the drive shaft extending to each of the front wheels. U.S. Pat. No. 4,145,896, the specification of which is incorporated herein, shows an outboard joint which is used at the wheel end of each of the drive shafts in the above vehicle. Since the drive shafts and joints on each side of the transmission are essentially identical, only one will be described in detail. Referring to FIGS. 1 and 2, the apparatus of this invention includes a seamless steel tube 10 preferably of C1050 grade which forms the drive shaft and is rotatable about its longitudinal axis. A slot 12 extends transversely through the tube at the end of it which is adjacent the transmission. The slot need not extend longitudinally clear to the end of the tube, however, as will be described hereinafter this facilitates assembly of the joint. I refer to the slots in diametric opposite positions in the tube walls as a single slot in order to include a slot in a tube or solid drive shaft in the same terminology in the claims. Thus, the walls of the tube base are also to be considered as part of the opposite sidewalls 14, 16 of the slot. The joint also includes steel cylinder 18 preferably formed by drawing a stamping from coiled strip or alternatively of seam welded strip. Splined input shaft 20 which fits into and is driven by the transmission has a cup 22 which is electron beam welded to cylinder 18 so as to close one end thereof. Solid pin shaft 24, preferably made of hardened 52100 grade steel, extends lengthwise through a slot 12. Shaft 24 has centering means including a ball 28 mounted in a socket on each of its longitudinal sides facing the slot sidewalls. Balls 28 ride in longitudinal channels 30 along the center of slot sidewalls 14, 16 and are slidable as well as rotatable therein. Shaft 24 is connected to cylinder 18 and positioned so as to be normal to the axis of rotation of the cylinder. Preferably shaft 24 has planar faces 27, 29 engaging each of the slot sidewalls and is rotatably connected to cylinder 18 by bearing cups 31, 33 at its opposite ends to provide axial rotation of the member with respect to the cylinder. Means is provided to limit slidable movement of tube 10 with respect to shaft 24 and preferably includes cap 32 welded to the end of the tube when the slot extends to the end thereof. Rubber boot 34 fastened to the end of cylinder 18 by band 36 and to tube 10 by band 38 prevents loss of grease from the joint.

In assembling the joint I take tube 10 and slide pin shaft 24 into the open end of the slot so that the balls 28 engage channels 30. Cap 32 is then welded to the end of the tube. I then tilt the shaft 24 slightly from the vertical as viewed in FIGS. 1 and 2 and insert it into cylinder 18. Bearing cups 31, 33 are then snapped onto opposite ends of the shaft and are then welded to cylinder 18 securing the shaft in position.

It will be apparent that various modifications of the design are possible without departing from the scope of the invention. For example, it is conceivable that the slot need not extend transversely clear through the drive shaft provided sufficient space is made available for the pin shaft to pivot in the slot as well as slide therealong. However, I prefer the embodiment first described because it is easier to fabricate and assemble, and also provides articulation to larger angles.

I claim:

1. A constant velocity universal joint, comprising: first and second rotatable bodies, at least one of said bodies being angularly and axially displaceable with respect to the other, the first of said bodies having an axial elongated slot extending transversely through said body adjacent one end thereof, said second body having an internal hollow cavity loosely housing the slotted portion of said first body, an elongated torque transmitting member extending longitudinally in the transverse direction of said first body in said slot and engaging opposite sidewalls thereof for transmitting rotary motion between said bodies, rotary mounting means fixedly mounted in said second body and journaling opposite ends of said member, said member being connected to said second body at right angles to the axis of rotation thereof and being slidable and pivotable within said slot in the first body in the direction of the length thereof so as to permit substantial angular and axial articulation of said bodies, said slot in the first body having a channel approximately semicircular in cross section extending along the longitudinal centerline of each of the opposite sidewalls thereof, and centering means comprising ball-shape means on each of the long sides of said member engaging said channels so as to maintain the centerpoint of said member coincident with the longitudinal axis of said slot during angular and axial movements of said bodies.

2. The apparatus of claim 1 wherein said member has flat planar surfaces engaging the sidewalls of said slot.

3. The apparatus of claim 1 wherein said slot extends longitudinally through one end of said first body, and further comprising means for limiting relative sliding movement of said member in the slot so as to prevent complete separation of the bodies.

* * * * *